(12) United States Patent
Cypher et al.

(10) Patent No.: US 8,732,407 B2
(45) Date of Patent: May 20, 2014

(54) DEADLOCK AVOIDANCE DURING STORE-MARK ACQUISITION

(75) Inventors: Robert E. Cypher, Saratoga, CA (US); Haakan E. Zeffer, Santa Clara, CA (US); Shailender Chaudhry, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1170 days.

(21) Appl. No.: 12/273,697

(22) Filed: Nov. 19, 2008

(65) Prior Publication Data

US 2010/0125707 A1 May 20, 2010

(51) Int. Cl.
*G06F 12/00* (2006.01)
*G06F 13/00* (2006.01)
*G06F 13/28* (2006.01)

(52) U.S. Cl.
USPC ........... 711/140; 711/118; 711/130; 711/141; 711/144; 711/145; 711/150; 711/151; 711/152; 711/156; 711/158

(58) Field of Classification Search
None
See application file for complete search history.

(56) References Cited

U.S. PATENT DOCUMENTS

2004/0162951 A1* 8/2004 Jacobson et al. ............... 711/143
2008/0104326 A1* 5/2008 Cypher et al. ................ 711/122

OTHER PUBLICATIONS

Rajwar; Transactional lock-free execution of lock based programs; Dec. 2002.*

* cited by examiner

*Primary Examiner* — Sanjiv Shah
*Assistant Examiner* — Marwan Ayash
(74) *Attorney, Agent, or Firm* — Park, Vaughan, Fleming & Dowler LLP; Anthony P. Jones

(57) ABSTRACT

Some embodiments of the present invention provide a system that avoids deadlock while attempting to acquire store-marks on cache lines. During operation, the system keeps track of store-mark requests that arise during execution of a thread, wherein a store-mark on a cache line indicates that one or more associated store buffer entries are waiting to be committed to the cache line. In this system, store-mark requests are processed in a pipelined manner, which allows a store-mark request to be initiated before preceding store-mark requests for the same thread complete. Next, if a store-mark request fails, within a bounded amount of time, the system removes or prevents store-marks associated with younger store-mark requests for the same thread, thereby avoiding a potential deadlock that can arise when one or more other threads attempt to store-mark the same cache lines.

19 Claims, 5 Drawing Sheets

DEADLOCK AVOIDANCE DURING STORE-MARK ACQUISITION

BACKGROUND

1. Field

The present invention relates to the design of processors within computer systems. More specifically, the present invention relates to a technique for avoiding deadlock while attempting to acquire store-marks on cache lines, wherein a store-mark on a cache line indicates that one or more store buffer entries associated with the cache line are waiting to be committed.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a memory reference, such as a load, generates a cache miss, the subsequent access to level-two (L2) cache or memory can require dozens or hundreds of clock cycles to complete, during which time the processor is typically idle, performing no useful work.

In contrast, cache misses during stores typically do not affect processor performance as much because the processor usually places the stores into a "store queue" and continues executing subsequent instructions. Existing store queue designs typically maintain an array of pending stores in program order. Note that some of these pending stores can possibly be directed to the same word in the same cache line. In particular, if consecutive stores are directed to the same word, these stores can be effectively merged into a single entry in the store queue without violating a conventional memory model, such as the Total-Store-Order (TSO) memory model. This merging can effectively reduce the memory bandwidth because the number of memory accesses is reduced.

However, when "non-consecutive" stores (that is, stores that are separated, in program order, by one or more stores by the same thread to a different word) directed to a same word are pending in a store queue, these non-consecutive stores to the same word typically cannot be merged without violating a conventional memory model, such as TSO. TSO is violated because merging non-consecutive stores effectively reorders the stores with respect to other intervening memory accesses.

This problem can be mitigated by "store-marking" cache lines to indicate that one or more store buffer entries are waiting to be committed to the cache lines, and then delaying accesses to the store-marked cache lines by other threads. In this way, stores to a given cache line can be reordered, thereby allowing non-consecutive stores to be merged without violating TSO.

For efficiency reasons, it is desirable to process store-mark requests in a pipelined manner, to allow a given store-mark request to be initiated before preceding store-mark requests for the same thread complete. Unfortunately, this can give rise to a deadlock condition when one or more other threads are attempting to store-mark the same cache lines. For example, assume that a first thread attempts to store-mark a cache line A and then attempts to store-mark a cache line B. At the same time, assume a second thread attempts to store-mark cache line B and then attempts to store-mark cache line A. If the first thread successfully store-marks cache line B and the second thread successfully store-marks cache line A, a deadlock condition can arise. In particular, a deadlock will arise if the first thread is waiting for the second thread to release the store-mark on cache line A before the first thread will release the store-mark on cache line B, and if the second thread is waiting for the first thread to release the store-mark on the cache line B before the second thread will release the store-mark on cache line A.

Hence, what is needed is a method and an apparatus for avoiding deadlock while store-marking cache lines.

SUMMARY

Some embodiments of the present invention provide a system that avoids deadlock while attempting to acquire store-marks on cache lines. During operation, the system keeps track of store-mark requests that arise during execution of a thread, wherein a store-mark on a cache line indicates that one or more associated store buffer entries are waiting to be committed to the cache line. In this system, store-mark requests are processed in a pipelined manner, which allows a store-mark request to be initiated before preceding store-mark requests for the same thread complete. Next, if a store-mark request fails, within a bounded amount of time, the system removes or prevents store-marks associated with younger store-mark requests for the same thread, thereby avoiding a potential deadlock that can arise when one or more other threads attempt to store-mark the same cache lines.

In some embodiments, keeping track of the store-mark requests involves maintaining state information for the store-mark requests in a structure which is dedicated to storing state information for store-mark requests.

In some embodiments, keeping track of the store-mark requests involves maintaining state information for the store-mark requests in a store queue which is used to buffer stores while the stores are being propagated to memory.

In some embodiments, keeping track of the store-mark requests involves maintaining state information for the store-mark requests, wherein a store-mark request can be in one of the following states: (1) "not-sent," which indicates that the store-mark request has not been sent to the memory system; (2) "sent-but-not-acknowledged," which indicates the store-mark request has been sent, but has not been acknowledged; (3) "obtained," which indicates that an associated store-mark has been obtained on an associated cache line; and (4) "failed-due-to-conflict," which indicates that the store-mark request failed, and the failure could have occurred because another thread holds a store-mark on the same cache line.

In some embodiments, removing or preventing store-marks associated with younger store-mark requests for the same thread involves first examining the state information for the younger store-mark requests. Next, (1) if a younger store-mark request is in the not-sent state, the system suppresses the sending of the younger store-mark request. On the other hand, (2) if the younger store-mark request is in the sent-but-not-acknowledged state, the system waits for an acknowledgment. If the acknowledgment indicates the younger store-mark request failed, the system does nothing about the failure of the younger store-mark request. Otherwise, if the acknowledgment indicates that the associated store-mark has been obtained, the system removes the associated store-mark within a bounded amount of time. (3) If the younger store-mark request is in the obtained state, the system removes the store-mark associated with the younger store-mark request from the cache line. Finally, (4) if the younger store-mark request is in the failed-due-to-conflict state, the system does nothing about the failure of the younger store-mark request.

In some embodiments, if the thread already has a pending store-mark request which is directed to a given cache line, the system suppresses additional store-mark requests from the thread which are directed to the same cache line.

In some embodiments, upon receiving a memory operation, such as a load operation or a store operation, which is being executed by the thread, the system performs the following actions. First, the system determines whether the thread has store-marked a cache line associated with the memory operation. If so, the system performs the memory operation. On the other hand, if the thread has not store-marked the cache line, the system determines if the cache line has been store-marked by another thread. If so, the system delays the memory operation. If not, the system performs the memory operation.

In some embodiments, if the cache line has not been store-marked and if the memory operation is a store operation, the system store-marks the cache line and enqueues the store operation in a store queue.

In some embodiments, the system reorders stores directed to a set of cache lines which are store-marked by the thread, wherein reordering the stores involves merging consecutive and non-consecutive stores which are directed to the same cache line.

DETAILED DESCRIPTION

Figure 1A:
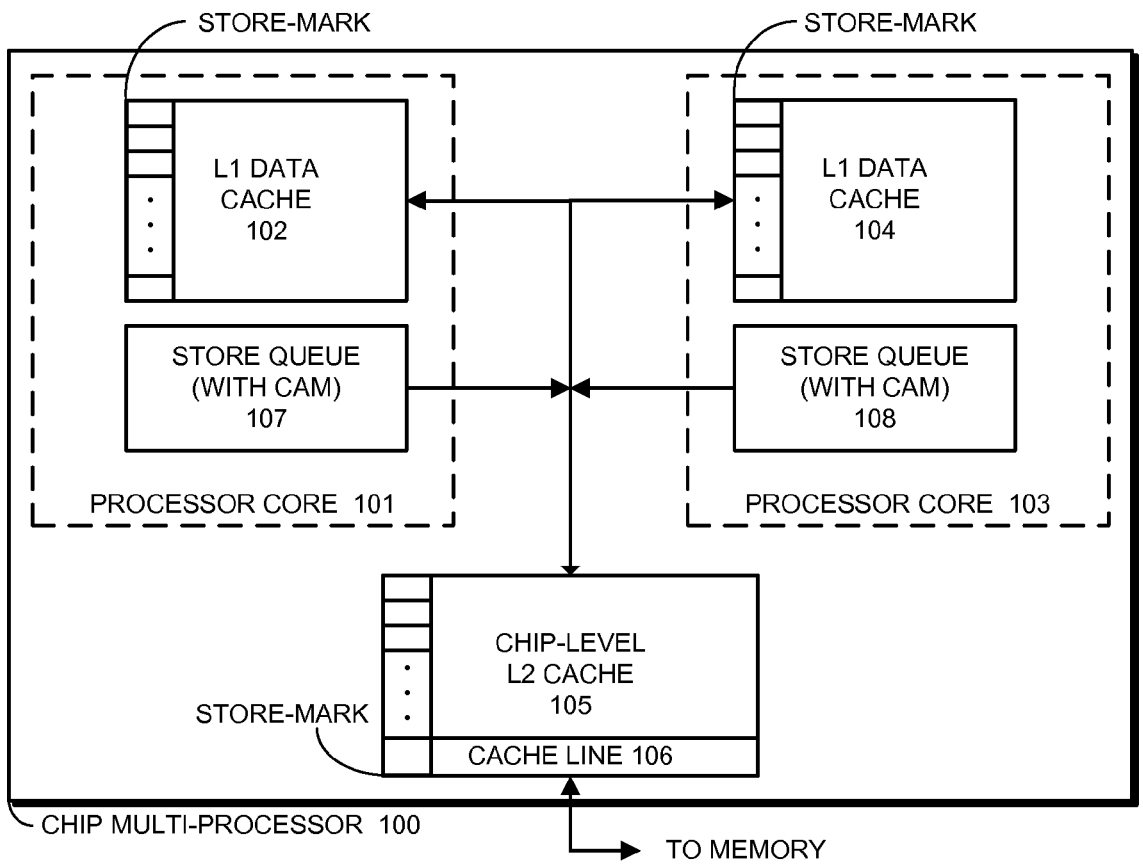
FIG. 1A illustrates an exemplary Chip Multi-Processor (CMP) system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention provides a memory system which allows stores from a thread to be reordered. To accomplish this without violating a memory model such as TSO, the present invention adds a store-mark to cache lines that are stored to, wherein the store-mark can be propagated to all levels of the memory hierarchy, including all caches and main memory. In addition, each thread maintains a private buffer which keeps track of the addresses of all cache lines for which the thread has set the store-mark. When a particular cache line is store-marked by a thread, that thread obtains exclusive access to the cache line through a cache-coherence mechanism. Because no other thread can access the cache line while the thread's store-mark is set, both consecutive and non-consecutive stores to the same word in the cache line can be merged into a single entry in a store queue for the thread. Furthermore, stores directed to a same store-marked cache line can also be merged into a single store to the memory hierarchy to reduce memory bandwidth.

The present invention is described in more detail below, but first we describe how the store queue fits into a computer system.

Computer System

FIG. 1A illustrates an exemplary Chip Multi-Processor (CMP) system 100 in accordance with an embodiment of the present invention. CMP system 100 is incorporated onto a single semiconductor die, and includes two processor cores, 101 and 103.

Processor cores 101 and 103 include L1 data caches 102 and 104, respectively, and they share L2 cache 105. Along with L1 data caches 102 and 104, processor cores 101 and 103 include store queues 107 and 108, which buffer pending store operations.

During a store operation in processor core 101, processor core 101 first performs a lookup for a corresponding cache line in L1 data cache 102. If the lookup generates a miss in L1 data cache 102 (or if store queue 107 is not empty), processor core 101 creates an entry for the store in store queue 107 and sends a corresponding request for the store to L2 cache 105.

During a subsequent load operation, processor core 101 uses a CAM structure to perform a lookup in store queue 107 to locate completed but not-yet-retired stores to the same address that are logically earlier in program order. For each byte being read by the load operation, if such a matching store exists, the load operation obtains its value from store queue 107 rather than from the memory subsystem.

Note that each cache line in L1 data cache 102, L1 data cache 104, and L2 cache 105, as well as in the memory (not shown) can include a store-mark. This store-mark can be used to prevent conflicting memory references from taking place. We discuss how the store-mark is used in more detail below.

Figure 1B:
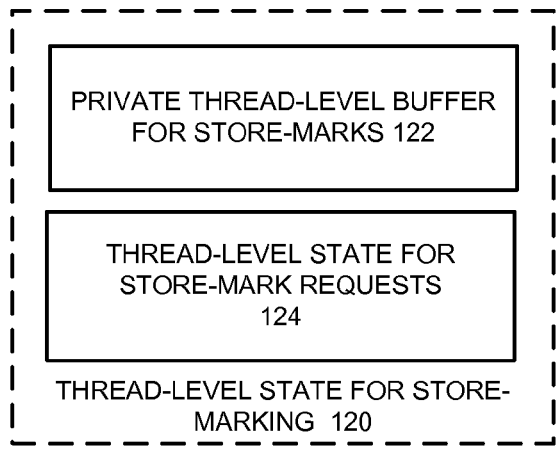
FIG. 1B illustrates thread-level state information which is used for store-marking purposes in accordance with an embodiment of the present invention.

Additionally, the system can provide structures for storing thread-level state information which is used for store-marking purposes 120 in accordance with an embodiment of the present invention (see FIG. 1B). More specifically, these structures 120 can include a private thread-level buffer 122 for each thread, which keeps track of addresses for store-marked cache lines for the thread. This private thread-level buffer 122 enables the system to quickly determine whether a cache line has been store-marked by the thread. For example, the system can perform a lookup in the private thread-level buffer 122 based on the address of a memory reference to locate a matching address for a store-marked cache line. Note that the private thread-level buffer 122 can be structured as a CAM to facilitate lookups based on addresses. Additionally, this private thread-level buffer for store-marks 122 can be stored in a separate dedicated structure within each processor.

The thread-level state information can additionally include thread-level state information for store-mark requests 124. For example, this state information can indicate whether a given store-mark request is: (1) not-sent, which indicates that the given store-mark request has not been sent to the memory system; (2) sent-but-not-acknowledged, which indicates the given store-mark request has been sent, but has not been acknowledged; (3) obtained, which indicates that an associated store-mark has been obtained on an associated cache line; and (4) failed-due-to-conflict, which indicates that the store-mark request failed, and the failure could have occurred because another thread holds a store-mark on the same cache line. Note that this thread-level state information for store-mark requests 124 can be stored in a separate dedicated structure within each processor, or alternatively, can be incorporated in entries for corresponding stores in store queues 107-108.

Performing Memory Operations to a Store-Marked Cache Line

One embodiment of the present invention can set a store-mark in each cache line in all levels of the memory hierarchy, including all caches (L1 caches 102 and 104, L2 cache 105 in FIG. 1A) and main memory, wherein the store-mark can occupy a single bit or multiple bits.

Each store-mark can have two states: (1) set and (2) clear, which are controlled by active threads of the computer system. When a store-mark for a cache line is set, the cache line is effectively locked by the thread which set the store-mark, and is hence not available to other threads. We will use the term "store-marked" to refer to the "set" state of a store-mark.

When a particular cache line is store-marked by a thread, the thread obtains exclusive access to the cache line. On the other hand, when the store-mark for the cache line is clear, the cache line is typically available to be accessed by memory references from any thread (we will discuss an exceptional case associated with cache-coherence below). The store-mark for a cache line is visible to all threads, so that it can be used by a thread to determine whether the cache line can be accessed.

Because the memory system treats store-marked cache lines as though they are locked, other threads that request a store-marked cache line must wait until the cache line is no longer store-marked before they can access the cache line. In one embodiment of the present invention, a thread attempting to access a store-marked cache line receives a NACK signal indicating that it must retry the load or store. In the case of a load, the load could be treated as if it missed in the cache, thereby causing the load to be deferred.

In one embodiment of the present invention, each thread maintains a private buffer containing addresses for cache lines which have been store-marked by the thread. Hence, whenever a thread needs to load or store to a cache line, that thread first checks its private buffer to see if it has already set the store-mark for the cache line. In one embodiment of the present invention, this private buffer can be implemented as an SRAM-based CAM. SRAM CAMs are known in the art and hence are not described in detail.

In one embodiment of the present invention, each store queue entry is used to hold uncommitted stores associated with a particular thread. Some of these stores may be directed to a cache line which has been store-marked by the thread. In this case, because no other threads can access the cache line, the stores (whether they be consecutive stores or non-consecutive stores) can be sequentially merged into a corresponding store queue entry. We discuss store merging in more detail below.

Figure 2:
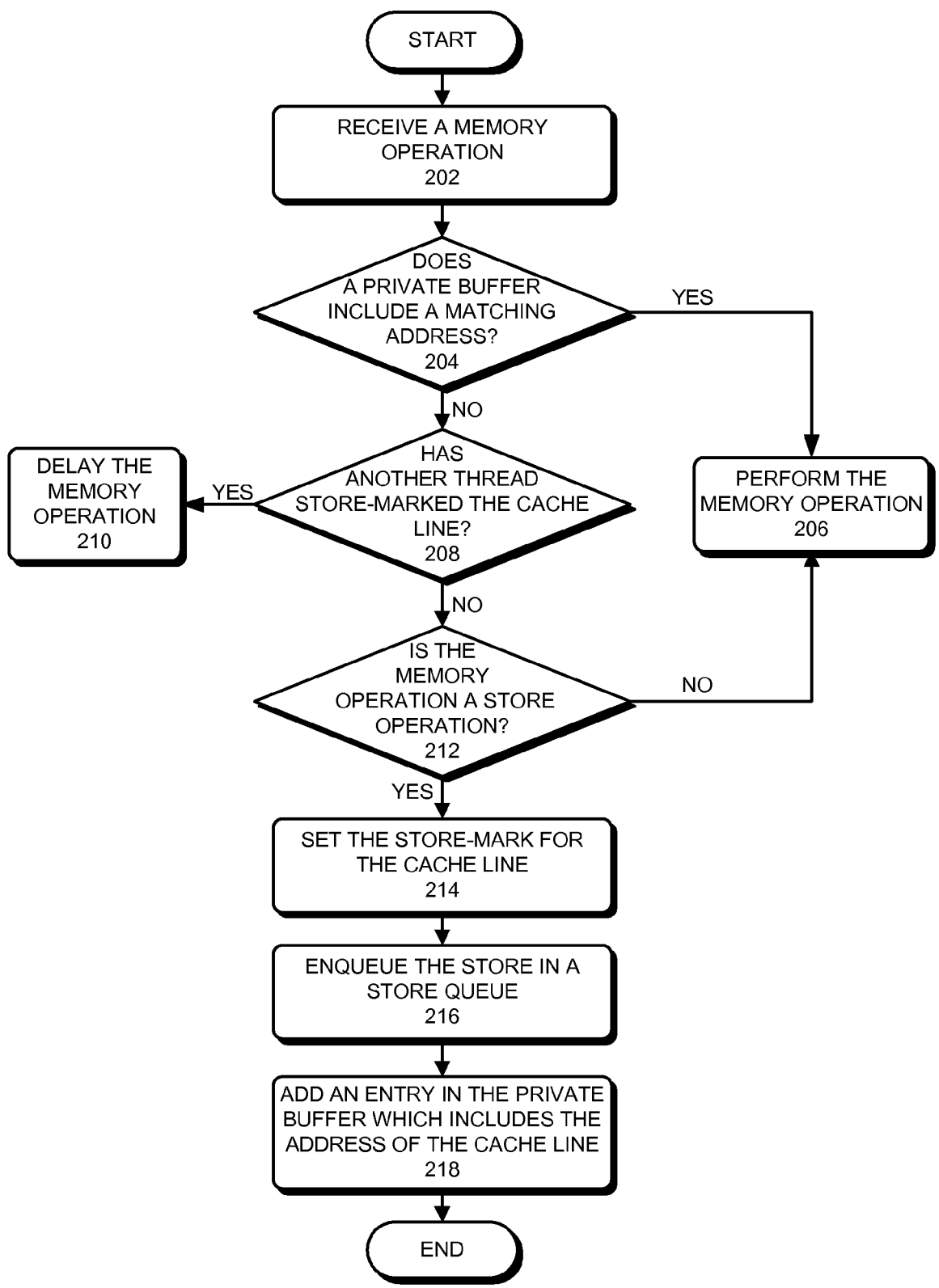
FIG. 2 presents a flowchart illustrating the process of performing a memory operation, such as a load or a store, in accordance with an embodiment of the present invention.

FIG. 2 presents a flowchart illustrating the process of performing a memory operation, such as a load or a store, in accordance with an embodiment of the present invention.

The system first receives a memory operation for a thread which is directed to a cache line (step 202).

Next, the system checks a private buffer for the thread, which keeps track of addresses for store-marked cache lines, to determine whether a store-mark for the cache line has been set by the thread (step 204). Specifically, the system performs a lookup in the thread's private buffer based on the address of the memory reference to locate a matching address for a store-marked cache line. Note that the private buffer can be structured as a CAM, which facilitates lookups based on addresses.

If the private buffer contains a matching address, the thread knows that it has already set the store-mark for the cache line, and can proceed with the memory operation (step 206).

If, however, the private buffer does not contain a matching address, the thread concludes that it has not set the store-mark. The thread subsequently determines (using the process below) whether the cache line has been store-marked by another thread (step 208), and if so, the memory operation is delayed (step 210)

Figure 3:
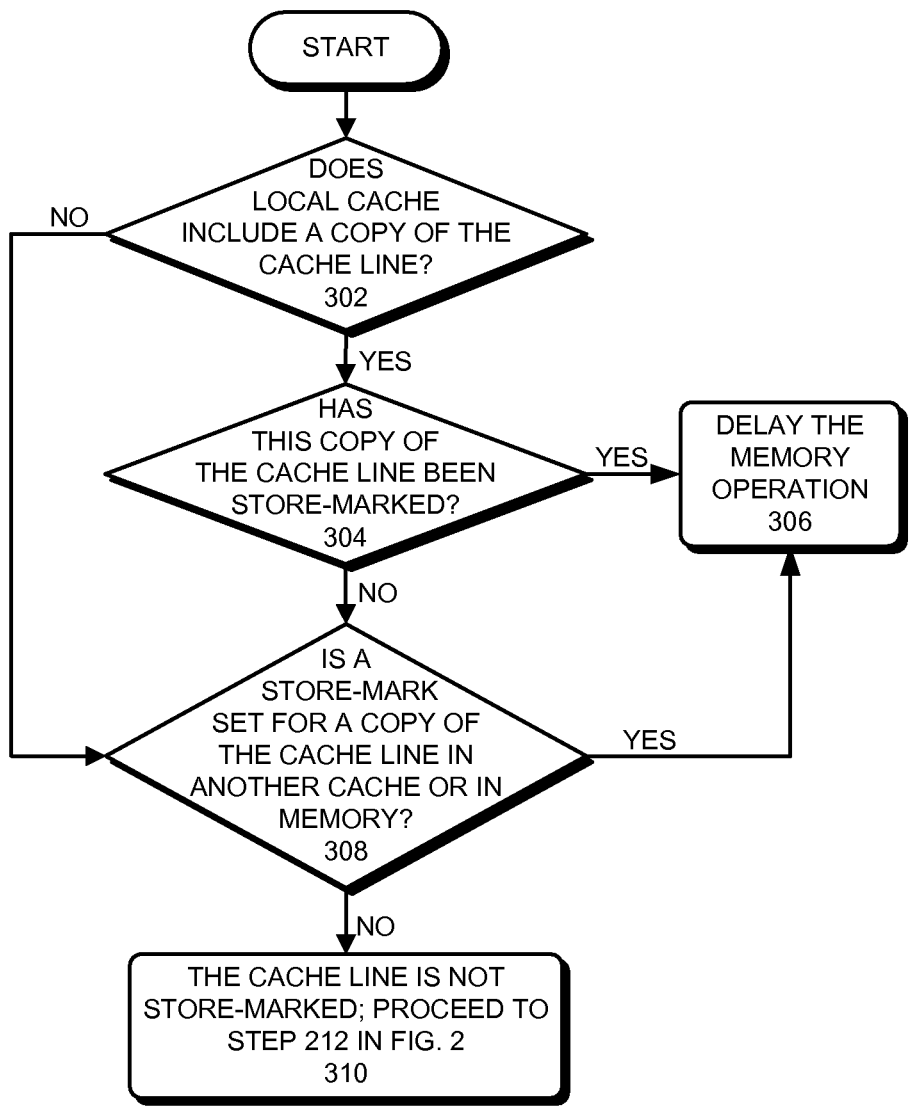
FIG. 3 presents a flowchart illustrating the process of determining whether the cache line has been store-marked by another thread in accordance with an embodiment of the present invention.

FIG. 3 presents a flowchart illustrating the process of determining whether the cache line has been store-marked by another thread in accordance with an embodiment of the present invention. (This flow chart describes in more detail the process which takes place in step 208 in FIG. 2 above.) During this process, the thread first checks in its local cache for a copy of the cache line (step 302). If the thread finds a copy of the cache line, it examines the store-mark to determine whether the cache line has been store-marked by another thread (step 304). If so, the memory operation is delayed (step 306).

If the store-mark in the copy of the cache line is not set, the system determines whether the store-mark has been set in another copy of the cache line which exists in another cache or in memory (step 308). If so, the memory operation is delayed (step 306). Otherwise, the process ends and the system returns to step 212 in FIG. 2 (step 310).

In step 308, note that the system can use a cache-coherence mechanism to determine whether another cache or the memory holds a store-marked copy of the cache line. This can involve sending an access request for the cache line to the other caches. If the cache line has been store-marked in another cache, the system will receive a NACK signal from the other cache which causes the request to fail, in which case the memory operation can be retried. If, however, the system does not receive a NACK signal, it can then obtain access to that cache line.

Referring back to step 206 of FIG. 2, note that in order to perform the memory operation, it may be necessary to use the cache coherence protocol to obtain a copy of the cache line in a suitable state in the local cache. For example, if the memory operation is a load, it may be necessary to obtain a copy of the cache line in the shared (S), exclusive (E), owned (O), or modified (M) state. Similarly, if the memory operation is a store, it may be necessary to obtain a copy of the cache line in the E or M state (and if it is in the E state, it may be necessary to change it to the M state upon performing the store). Note that if the cache coherence protocol is used to obtain a copy of the cache line in the E or M state, the request for this copy may differ from the exclusive access request mentioned in the description of step 308 of FIG. 3. This is because in step 206 the thread performing the store has already placed a mark on the cache line, and thus the request should not receive a NACK signal.

Referring back to step 212 of FIG. 2, when the thread obtains access to the cache line, it determines whether the memory operation is a store operation. If so, the thread obtains writable access to the cache line through a cache-coherence mechanism, which can involve obtaining the cache line in the Exclusive state or the Modified state. The system then sets the store-mark for the cache line (step 214). Next, the thread enqueues the store operation in a store queue (step 216). The thread also adds a corresponding entry to the private buffer which includes the address of the cache line (step 218). Note that this entry will remain in the private buffer until subsequent changes are made to the state of the cache line, such as removing the store-mark.

In one embodiment of the present invention, when a thread performs one or more stores to the store-marked cache line, the last of the stores can include a flag indicating that the store-mark should be cleared. When such a flag is encountered, the system releases the store-marked cache line by unsetting the store-mark in a copy of the cache line in its local cache, and additionally removing the address of the cache line from its private buffer.

In one embodiment of the present invention, once a thread has placed a store-mark on a cache line, all valid copies of that cache line in any of the caches and in memory must contain that store-mark. As a result, if a copy of a cache line with a store-mark is replaced from a cache, and if this replacement makes the copy of the cache line in memory valid, it is necessary to ensure that the copy in memory also contains the store-mark. This could be accomplished by writing back the store-mark to memory when the cache line is replaced from the cache.

While the above description has assumed a store-mark that has only 2 values, namely set and unset, alternate implementations are possible. For example, it is possible to use a store-mark that is either set or unset, and if it is set, it records the identity of the thread that sets it. Note that when such a store-mark is used, in step 204 it is not necessary to check the private buffer to determine if the thread attempting to perform the memory access has placed a store-mark on the cache line. Instead, it is possible to check the store-mark on the cache line to make this determination. Also, note that if the store-mark includes the identity of the thread that placed it, the cache coherence requests for exclusive access in steps 206 and 308 can be identical, provided they include the identity of the thread performing the request.

Note that it is possible for a thread to place store-marks on cache lines prior to performing certain stores and to not place store-marks on cache lines prior to making other stores. For example, a thread may reorder some stores and not reorder other stores, in which case it may not place store-marks on some or all of the stores that it does not reorder.

Applications of Cache Line Store-Marking

Merging Stores Directed to the Same Word

As mentioned previously, consecutive stores directed to the same word in a cache line can be merged into a single entry in the store queue without violating the TSO memory model.

In addition, store-marks can be used to enable non-consecutive stores directed to a same word to be merged into a single entry in the store queue. This store merging can be accomplished by merging the bytes that are updated by the younger store into the corresponding word in the store queue which has been updated by older stores. It also involves updating corresponding byte mask bits by logically OR-ing the byte masks of the merged stores. Because the thread has exclusive access to the store-marked cache line, this merging is not visible to other threads, and hence will not cause memory model violations. Furthermore, because the stores are merged into one entry in the store queue, only one store queue entry needs to be applied to the memory.

Merging Stores Directed to the Same Cache Line

In addition to allowing stores directed to the same word to be merged in the store queue, store-marking also allows non-consecutive stores directed to the same cache line to be merged before the cache line is propagated to the memory hierarchy. The stores can generally be merged in any order, except that when stores overlap on a byte, the system must ensure that the byte ultimately contains the value of the last store to the byte in the program order.

Note that the merged cache line contains the cumulative result of the multiple stores. This allows a single merged store operation to be propagated to the memory hierarchy instead of multiple separate store operations. This reduces bandwidth to memory.

In one embodiment of the present invention, the act of propagating a store operation to the memory subsystem also clears the store-mark for the cache line.

Reordering Stores to Store-Marked Cache Lines

Another benefit of store-marking cache lines is that it allows a set of stores to be propagated from the store buffer into the memory hierarchy in arbitrary order, provided that the set of stores are all store-marked simultaneously. If a set of cache lines are all store-marked simultaneously at a single point in time, they all appear to have been stored to at the single point in time, and in program order, from the perspective of other threads. This ensures that the TSO memory model is not violated.

In addition, store-marks can be used to make a set of stores appear to be atomic in memory order, thereby facilitating implementations of transactional memory.

Avoiding Deadlock During the Store-Marking Process

Figure 4:
FIG. 4 presents a flow chart illustrating a process which avoids potential deadlocks during the store-marking process in accordance with an embodiment of the present invention.

FIG. 4 presents a flow chart illustrating a process which avoids potential deadlocks during the store-marking process in accordance with an embodiment of the present invention. During operation, the system keeps track of store-mark requests for each thread (step 402). As mentioned previously, the system can process store-mark requests in a pipelined manner, which allows a given store-mark request to be initiated before preceding store-mark requests for the same thread complete. Unfortunately, this can cause a deadlock condition when one or more other threads attempt to store-mark the same cache lines. To avoid a potential deadlock condition, if a given store-mark request fails, within a bounded amount of time the system removes or prevents store-marks associated with younger store-mark requests for the same thread (step 404).

Figure 5:
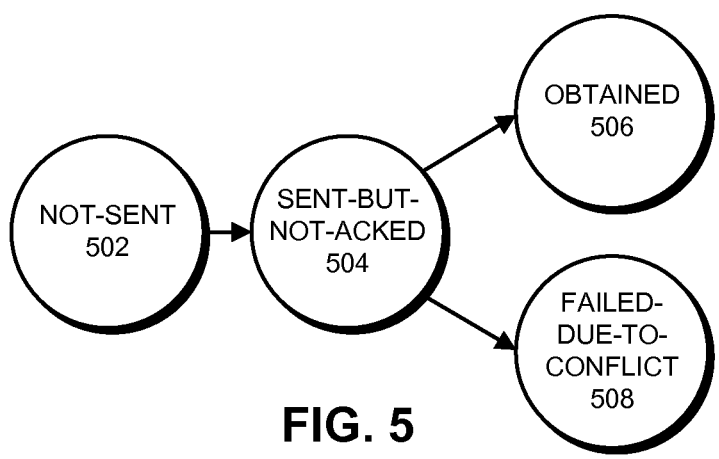
FIG. 5 presents a state diagram for store-mark requests in accordance with an embodiment of the present invention.

FIG. 5 presents a state diagram specifying transitions between possible states for a store-mark request in accordance with an embodiment of the present invention. First, the store-mark request starts in the "not-sent" state 502, which indicates that the store-mark request has not been sent to the memory system. After the store-mark request has been sent to the memory system (to determine whether another thread holds a store-mark on a cache line associated with the request), the store-mark request transitions to the "sent-but-not-acknowledged" state 504, which indicates the store-mark request has been sent, but has not been acknowledged.

Next, an acknowledgment is received for the store-mark request. If this acknowledgment indicates that the store-mark has been successfully obtained, the store-mark request enters the "obtained" state 506. Otherwise, if the acknowledgment indicates that the store-mark request failed, and that the failure occurred because another thread could hold a store-mark on the same cache line, the store-mark request enters the "failed-due-to-conflict" state 508.

Figure 6:
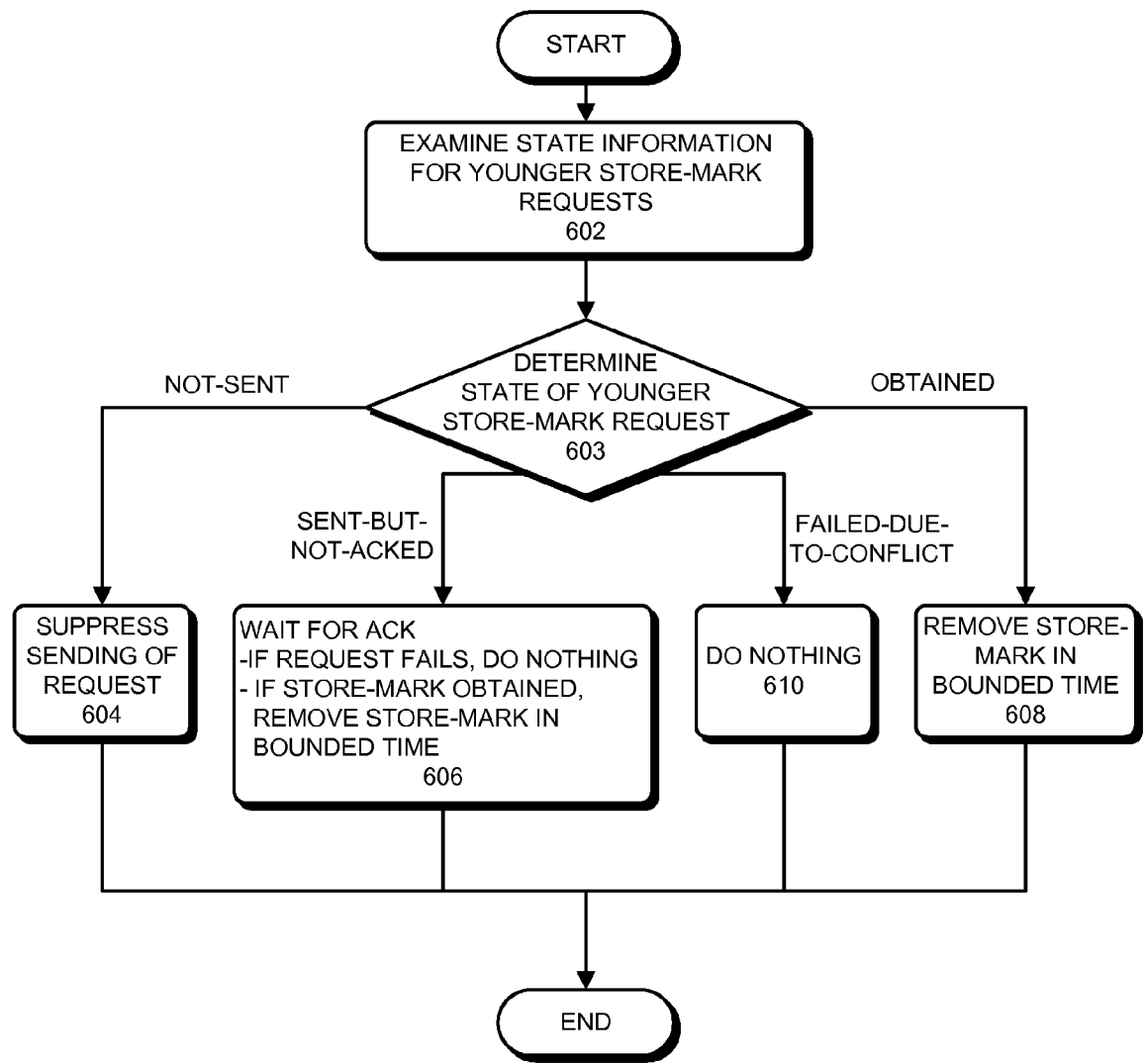
FIG. 6 presents a flow chart illustrating how younger store-mark requests are processed when a store-mark request fails in accordance with an embodiment of the present invention.

FIG. 6 presents a flow chart illustrating how younger store-mark requests are processed when a store-mark request fails (as in step 404 in FIG. 4) in accordance with an embodiment of the present invention. First, the system examines state information for the younger store-mark requests (step 602). This enables the system to determine the state of the younger store-mark request (step 603). If the younger store-mark request is in the "not-sent" state, the system suppresses the sending of the younger store-mark request (step 604). In contrast, if the younger store-mark request is in the "sent-but-not-acknowledged" state, the system waits for an acknowledgment. If the acknowledgment indicates the younger store-mark request failed, the system does nothing about the failure of the younger store-mark request. On the other hand, if the acknowledgment indicates that the associated store-mark has been obtained, the system removes the associated store-mark within a bounded amount of time (step 606). If the younger store-mark request is in the "obtained" state, the system removes the store-mark associated with the younger store-mark request from the cache line (step 608). Finally, if the younger store-mark request is in the "failed-due-to-conflict" state, the system does nothing about the failure of the younger store-mark request (step 610).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for avoiding deadlock while attempting to acquire store-marks on cache lines, comprising:
in a processor, performing operations for:
keeping track of store-mark requests that arise during execution of a thread, wherein a store-mark on a cache line indicates that one or more associated store buffer entries are waiting to be committed to the cache line;
wherein the store-mark requests are processed in a pipelined manner thereby causing a store-mark request to be initiated before preceding store-mark requests for the same thread complete;
when a store-mark request fails:
using state information for younger store-mark requests for the same thread to determine at least one previously-sent younger store-mark request in the younger store-mark requests for which a store-mark was obtained;
within a bounded amount of time, removing the store-mark that was obtained for the previously-sent younger store-mark request; and
continuing the execution of the thread after the removing of the store-mark.

2. The method of claim 1, wherein keeping track of the store-mark requests involves maintaining state information for the store-mark requests in a structure dedicated to storing state information for store-mark requests.

3. The method of claim 1, wherein keeping track of the store-mark requests involves maintaining state information for the store-mark requests in a store queue which is used to buffer stores while the stores are being propagated to memory.

4. The method of claim 1, wherein keeping track of the store-mark requests involves maintaining state information for the store-mark requests, wherein a given store-mark request is in one of the following states:
not-sent, which indicates that the given store-mark request has not been sent to the memory system;
sent-but-not-acknowledged, which indicates the given store-mark request has been sent, but has not been acknowledged;
obtained, which indicates that an associated store-mark has been obtained on an associated cache line; and
failed-due-to-conflict, which indicates that the store-mark request failed, and that the failure could have occurred because another thread holds a store-mark on the same cache line.

5. The method of claim 1, wherein if the thread already has a pending store-mark request which is directed to a cache line, the method further comprises suppressing additional store-mark requests from the thread which are directed to the same cache line.

6. The method of claim 1, further comprising:
receiving a memory operation which is being executed by the thread, wherein the memory operation is a load operation or a store operation;
determining whether the thread has set a store-mark for a cache line associated with the memory operation;
if the thread has set a store-mark for the cache line, performing the memory operation; and
if the thread has not set a store-mark for the cache line, determining if the cache line has been store-marked by another thread;
if the cache line has been store-marked by another thread, delaying the memory operation; and
if the cache line has not been store-marked by another thread, performing the memory operation or placing a store-mark on the cache line.

7. The method of claim 6, wherein if the cache line has not been store-marked and if the memory operation is a store operation, the method further comprises:
store-marking the cache line; and
enqueuing the store operation in a store queue.

8. The method of claim 1,
wherein the method further comprises reordering stores directed to a set of cache lines which are store-marked by the thread; and
wherein reordering the stores involves merging consecutive and non-consecutive stores which are directed to a same cache line.

9. A processor that avoids deadlock while attempting to acquire store-marks on cache lines, comprising:
the processor;
a store-marking mechanism within the processor configured to store-mark cache lines, wherein a store-mark on a cache line indicates that one or more associated store buffer entries are waiting to be committed to the cache line;
a store-mark-tracking mechanism within the processor configured to keep track of store-mark requests that arise during execution of a thread;
wherein the store-marking mechanism is configured to process store-mark requests in a pipelined manner thereby causing a store-mark request to be initiated before preceding store-mark requests for the same thread complete;
wherein, when a store-mark request fails, the store-marking mechanism is configured to:
use state information for younger store-mark requests for the same thread to determine at least one previously-sent younger store-mark request in the younger store-mark requests for which a store-mark was obtained;
within a bounded amount of time, remove the store-mark that was obtained for the previously-sent younger store-mark request; and
continue the execution of the thread after the removing of the store-mark.

10. The processor of claim 9, wherein while keeping track of the store-mark requests, the store-mark-tracking mechanism is configured to maintain state information for the store-mark requests in a structure dedicated to storing state information for store-mark requests.

11. The processor of claim 9, wherein while keeping track of the store-mark requests, the store-mark-tracking mechanism is configured to maintain state information for the store-mark requests in a store queue which is used to buffer stores while the stores are being propagated to memory.

12. The processor of claim 9, wherein while keeping track of the store-mark requests, the store-mark-tracking mechanism is configured to maintain state information for the store-mark requests, wherein a given store-mark request is in one of the following states:
not-sent, which indicates that the given store-mark request has not been sent to the memory system;
sent-but-not-acknowledged, which indicates the given store-mark request has been sent, but has not been acknowledged;
obtained, which indicates that an associated store-mark has been obtained on an associated cache line; and
failed-due-to-conflict, which indicates that the store-mark request failed, and that the failure could have occurred because another thread holds a store-mark on the same cache line.

13. The processor of claim 9, wherein if the thread already has a pending store-mark request which is directed to a cache line, the store-marking mechanism is configured to suppress additional store-mark requests from the thread which are directed to the same cache line.

14. The processor of claim 9, further comprising an instruction-processing mechanism within the processor, which is configured to,
receive a memory operation which is being executed by the thread, wherein the memory operation is a load operation or a store operation;
determine whether the thread has set a store-mark for a cache line associated with the memory operation;
if the thread has set a store-mark for the cache line, perform the memory operation; and
if the thread has not set a store-mark for the cache line, determine if the cache line has been store-marked by another thread;
if the cache line has been store-marked by another thread, delay the memory operation; and
if the cache line has not been store-marked by another thread, perform the memory operation or place a store-mark on the cache line.

15. The processor of claim 14, wherein if the cache line has not been store-marked and if the memory operation is a store operation, the instruction-processing mechanism is configured to:
store-mark the cache line; and
enqueue the store operation in a store queue.

16. The processor of claim 9,
the instruction-processing mechanism is configured to reorder stores directed to a set of cache lines which are store-marked by the thread; and
wherein reordering the stores involves merging consecutive and non-consecutive stores which are directed to a same cache line.

17. A computer system that avoids deadlock while attempting to acquire store-marks on cache lines, comprising:
a processor;
a memory;
a store-marking mechanism within the processor configured to store-mark cache lines, wherein a store-mark on a cache line indicates that one or more associated store buffer entries are waiting to be committed to the cache line;
a store-mark-tracking mechanism within the processor configured to keep track of store-mark requests that arise during execution of a thread;
wherein the store-marking mechanism is configured to process store-mark requests in a pipelined manner thereby causing a store-mark request to be initiated before preceding store-mark requests for the same thread complete;
wherein, when a store-mark request fails, the store-marking mechanism is configured to:
use state information for younger store-mark requests for the same thread to determine at least one previously-sent younger store-mark request in the younger store-mark requests for which a store-mark was obtained;
within a bounded amount of time, remove the store-mark that was obtained for the previously-sent younger store-mark request; and
continue the execution of the thread after the removing of the store-mark.

18. The method of claim 1, further comprising:
using the state information to determine at least one younger store-mark request in the younger store-mark requests for which a store-mark has not been requested, and when the store-mark request fails:
  suppressing sending a store-mark request for the store-mark that has not been requested; and
  continuing the execution of the thread after the suppressing.

19. The method of claim 4, further comprising:
using the state information to determine a younger store-mark request in the younger store-mark requests that is in the sent-but-not-acknowledged state;
when the store-mark request fails:
  waiting for an acknowledgment for the request that is in the sent-but-not-acknowledged state;
  when the acknowledgment indicates the request that is in the sent-but-not-acknowledged state failed, doing nothing; and
  when the acknowledgment indicates that the associated store-mark has been obtained, removing the associated store-mark within a bounded amount of time; and
using the state information to determine a younger store-mark request in the younger store-mark requests that is in the failed-due-to-conflict state; and
when the store-mark request fails, doing nothing about the failure of the younger store-mark request that is in the failed-due-to-conflict state,
wherein the at least one previously-sent younger store-mark request for the same thread for which the store-mark was obtained is in the obtained state,
wherein the store-mark request for the store-mark that has not been requested is in the not-sent state, and
wherein the removing comprises removing the store-mark that was obtained for the previously-sent younger store-mark request from the cache line.

* * * * *